US008595827B2

(12) United States Patent
Zondler et al.

(10) Patent No.: US 8,595,827 B2
(45) Date of Patent: Nov. 26, 2013

(54) SAFETY CONTROLLER AND METHOD FOR CONTROLLING AN AUTOMATED INSTALLATION

(75) Inventors: Martin Zondler, Ostfildern (DE); Helmut Ehrhart, Stuttgart (DE); Stefan Woehrle, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 13/115,494

(22) Filed: May 25, 2011

(65) Prior Publication Data
US 2012/0005748 A1    Jan. 5, 2012

Related U.S. Application Data

(63) Continuation of application No. PCT/EP2009/008269, filed on Nov. 20, 2009.

(30) Foreign Application Priority Data

Nov. 25, 2008   (DE) .......................... 10 2008 060 010

(51) Int. Cl.
*G06F 13/00* (2006.01)
(52) U.S. Cl.
USPC .................. 726/21; 726/26; 700/20; 700/79; 702/29; 702/54; 702/183
(58) Field of Classification Search
USPC .................. 726/2, 21, 26; 700/20, 29, 2, 4
See application file for complete search history.

(56) References Cited

U.S. PATENT DOCUMENTS 6,973,368 B2   12/2005 Schwesig
7,030,747 B2    4/2006 Scott et al.
(Continued)

FOREIGN PATENT DOCUMENTS

DE    197 46 014 A1    5/1998
DE    103 15 526 A1   10/2004
(Continued)

OTHER PUBLICATIONS

Yan Ye, Survey Cyber Security for Smart Grid Communications, Jan. 2012, IEEE, vol. 4, pp. 998-1010.*

(Continued)

*Primary Examiner* — Nathan Flynn
*Assistant Examiner* — Viral Lakhia
(74) *Attorney, Agent, or Firm* — Harness, Dickey & Pierce, P.L.C.

(57) ABSTRACT

A safety controller for controlling an automated installation has a control unit to which a plurality of control input signals are supplied from the sensors of the installation. The control unit produces a plurality of control output signals on the basis of the control input signals in accordance with a user program running in said control unit in an automatic mode. The plurality of control output signals actuate the actuators. The safety controller also has a diagnosis evaluation unit that ascertains which one of a plurality of operating states is present at a defined instant of time and produces an operating state signal which represents the ascertained operating state. A diagnosis selection unit generates a diagnosis report as a function of the operating state signal and as a function of a user access authorization signal and/or a special operating mode signal. The diagnosis report representing the ascertained operating state thus varies depending on specific circumstances, such as a certain user access authorization or a certain operating mode.

14 Claims, 2 Drawing Sheets

(56) References Cited

U.S. PATENT DOCUMENTS

| | | | |
|---|---|---|---|
| 7,103,427 B2* | 9/2006 | Dillon | 700/83 |
| 7,237,109 B2* | 6/2007 | Scott et al. | 713/164 |
| 7,330,768 B2* | 2/2008 | Scott et al. | 700/79 |
| 8,006,311 B2* | 8/2011 | Sitrick et al. | 726/28 |
| 8,046,588 B2* | 10/2011 | Gibart et al. | 713/186 |
| 2004/0210326 A1 | 10/2004 | Muneta et al. | |
| 2006/0218266 A1 | 9/2006 | Matsumoto et al. | |
| 2006/0241799 A1 | 10/2006 | Beck et al. | |
| 2007/0199047 A1* | 8/2007 | Gibart et al. | 726/2 |
| 2007/0297557 A1* | 12/2007 | Kuwatani | 376/259 |
| 2008/0004723 A1 | 1/2008 | Fax et al. | |
| 2008/0079596 A1 | 4/2008 | Baier et al. | |
| 2008/0082294 A1* | 4/2008 | Pihlaja et al. | 702/179 |
| 2008/0255681 A1 | 10/2008 | Scott et al. | |
| 2009/0085934 A1* | 4/2009 | Baier et al. | 345/660 |
| 2009/0204232 A1* | 8/2009 | Guru et al. | 700/9 |
| 2009/0234465 A1 | 9/2009 | Korsten | |

FOREIGN PATENT DOCUMENTS

| | | |
|---|---|---|
| DE | 10 2004 003 569 A1 | 12/2004 |
| DE | 103 92 438 T5 | 4/2005 |
| DE | 10 2005 008 517 A1 | 9/2005 |
| DE | 10 2005 014 050 A1 | 9/2006 |
| DE | 11 2005 001 031 T5 | 6/2007 |
| EP | 1 396 772 A1 | 3/2004 |
| EP | 1 708 056 A1 | 10/2006 |
| EP | 1 855 172 A1 | 11/2007 |
| GB | 2 399 192 B | 8/2006 |
| JP | 10-177412 | 6/1998 |
| JP | 2003-186536 | 7/2003 |
| JP | 2008-83965 | 4/2008 |

OTHER PUBLICATIONS

T. Stiedl; Framework fuer multimodale Bediensysteme in der Automatisierungstechnik; 2006; 10 pages.

EN 954-1; Safety-related parts of control systems, Part 1: General principles for design; Mar. 1997; 34 pages.

CEI IEC 61508-2; Functional safety of electrical/electronic/programmable electronic safety-related systems—Part 2 requirements for electrical/electronic/programmable electronic safety-related systems; 152 pages.

EN ISO 13849-1; Safety of machinery—Safety-related parts of control systems—Part 1: General principles for design; Nov. 2006; 97 pages.

English language translation of Notification of Reason(s) for Refusal for Japanese Patent Application No. 2011-536783 dated Jun. 27, 2013; 6 pp.

* cited by examiner

SAFETY CONTROLLER AND METHOD FOR CONTROLLING AN AUTOMATED INSTALLATION

CROSS REFERENCES TO RELATED APPLICATIONS

This application is a continuation of international patent application PCT/EP2009/008269 filed on Nov. 20, 2009 designating the U.S., which international patent application has been published in German language and claims priority from German patent application DE 10 2008 060 010.5 filed on Nov. 25, 2008. The entire contents of these priority applications are incorporated herein by reference.

BACKGROUND OF THE INVENTION

The present invention relates to a safety controller and to a method for controlling an automated installation which comprises a plurality of sensors and a plurality of actuators.

A safety controller in terms of the present invention is an appliance or an apparatus which receives input signals delivered by sensors and produces output signals therefrom by means of logic combinations and sometimes further signal or data processing steps. The output signals can then be supplied to actuators, which effect specific actions or reactions in the environment on the basis of the input signals.

A preferred area of application for safety controllers of this kind is in the field of machine safety for monitoring emergency-off pushbuttons, two-hand controllers, guard doors or light grids. Such sensors are used in order to safeguard a machine, for example, which presents a hazard to humans or material goods during operation. When the guard door is opened or when the emergency-off pushbutton is operated, a respective signal is produced which is supplied to the safety controller as an input signal. In response thereto, the safety controller then uses an actuator to shut down, for example, that part of the machine which is presenting the hazard.

In contrast to a "normal" controller, a characteristic of a safety controller is that the safety controller always ensures a safe state of the installation or machine presenting the hazard even if a malfunction occurs in it or in a device connected to it. Extremely high demands are therefore made of safety controllers in terms of their own failsafety, which results in considerable complexity for development and manufacture.

Usually, safety controllers require particular approval by competent supervisory authorities, such as by the professional associations or the TÜV in Germany, before they are used. In this case, the safety controller must observe prescribed safety standards as set down, by way of example, in the European Standard EN 954-1 or a comparable Standard, such as Standard IEC 6158 or Standard EN ISO 13849-1. In the following, a safety controller is therefore understood to mean a device or an arrangement which at least complies with safety category 3 of the cited European Standard EN 954-1.

A programmable safety controller allows the user to individually define the logic combinations and possibly further signal or data processing steps according to his needs using a piece of software, what is known as the user program. This results in a great deal of flexibility in comparison with earlier solutions, in which the logic combinations were produced by defined wiring between various safety devices. By way of example, a user program can be written using a commercially available personal computer (PC) and using appropriately set-up software programs.

The detection of malfunctions is of central importance in the field of safety control. This is because it is necessary to ensure that a controlled machine or installation is transferred to a safe state when a malfunction occurs.

Besides the actual detection of a malfunction and the triggering of appropriate countermeasures which are used to transfer the controlled machine or installation to a safe state, it is also important to provide, by way of example, the user of the controlled machine or installation or another person with information about a malfunction which is present. To this end, safety controllers and methods in the prior art display a diagnosis report which represents a malfunction using a display unit when a malfunction occurs. In this case, the diagnosis report displayed is merely dependent on the malfunction which has been ascertained by an appropriate diagnosis unit. There is no provision in this context for different diagnosis reports to be displayed for one and the same malfunction. There is therefore no opportunity, in the event of a malfunction occurring, to adjust the diagnosis report to be displayed in order to match external circumstances, for example. In this connection, an external circumstance is a circumstance which is defined neither by the user program itself stored in the safety controller nor by a variable which is processed as an input variable in the user program.

The detection of a malfunction corresponds to ascertaining which of a plurality of system states for a safety controller is present at a defined instant of time.

The above considerations apply not only to the detection of malfunctions and hence to the ascertainment of system states for a safety controller, but also to the ascertainment of process states for an installation or machine to be controlled. In this case too, the safety controllers and methods from the prior art do not allow to adjust a diagnosis report to external circumstances, when a process state has been ascertained.

Although the known safety controllers and methods ensure reliable ascertainment of system states for a safety controller and of process states for an installation to be controlled, they are not yet optimal for the conveyance of information, i.e. for the conveyance of that information which represents the ascertained system states and process states.

SUMMARY OF THE INVENTION

It is an object of the present invention to improve a safety controller and a method of the type cited at the outset in order to make the conveyance of that information which represents an ascertained process state for an installation to be controlled or a system state for a safety controller more flexible. It is also an object to provide a safety controller and a method which allow to vary diagnosis information depending on external circumstances.

In view of the above, there is provided a safety controller for controlling an automated installation which comprises a plurality of sensors and a plurality of actuators, comprising a control unit to which a plurality of control input signals are supplied by the sensors, wherein the control unit is designed to produce a plurality of control output signals on the basis of the control input signals in accordance with a user program running in said control unit in an automatic mode, wherein the plurality of control output signals are used to actuate the plurality of actuators; a diagnosis evaluation unit to which a number of diagnosis input signals are supplied, wherein the diagnosis evaluation unit is designed to take the number of diagnosis input signals as a basis for ascertaining which of a plurality of operating states is present at a defined instant of time, wherein the plurality of operating states comprise at least one process state for the installation to be controlled and at least one system state for the safety controller, wherein the diagnosis evaluation unit produces at least one operating state signal which represents an ascertained operating state; a display unit designed to display diagnosis reports; an operating mode selection unit which is designed to select one of a plurality of special operating modes which are different from one another, wherein the special operating modes each are different from the automatic mode, wherein the mode selection unit provides a special operating mode signal which represents a selected special operating mode, wherein said special operating mode signal is supplied to the control unit in order to operate the installation in the selected special operating mode; a detection unit, wherein the detection unit is designed to detect an access authorization associated with a person interacting with the safety controller, wherein the detection unit provides an access authorization signal which represents the detected access authorization; and a diagnosis selection unit to which the operating state signal and at least one of the special operating mode signal and the access authorization signal are supplied, wherein the diagnosis selection unit determines a diagnosis report which represents the ascertained operating state as a function of the ascertained operating state and the at least one of the selected special operating mode and the detected access authorization, wherein the diagnosis selection unit produces a diagnosis signal which represents the diagnosis report and which is supplied to the interface for the display unit for the purpose of displaying the diagnosis report.

There is also provided a method for controlling an automated installation which comprises a plurality of sensors and a plurality of actuators, the method comprising the following steps: supplying a plurality of control input signals to a control unit by the sensors, wherein the control unit produces a plurality of control output signals in an automatic mode on the basis of the control input signals and in accordance with a user program running in said control unit, wherein the plurality of control output signals actuate the plurality of actuators; ascertaining which of a plurality of operating states is present at a defined instant of time on the basis of a number of diagnosis input signals, wherein the plurality of operating states comprise at least one process state for the installation to be controlled and at least one system state for the safety controller, and producing an operating state signal which represents an ascertained operating state; selecting one of a plurality of special operating modes which are different from one another, wherein the special operating modes each are different from the automatic mode, and providing a special operating mode signal which represents the selected special operating mode; detecting an access authorization associated with a person interacting with the safety controller, and providing an access authorization signal which represents the detected access authorization; supplying the operating state signal and at least one of the special operating mode signal and the access authorization signal to a diagnosis selection unit; determining a diagnosis report representing the ascertained operating state as a function of the ascertained operating state and as a function of at least one of the selected special operating mode and the detected access authorization, and producing a diagnosis signal representing the diagnosis report in the diagnosis selection unit; and supplying the diagnosis signal to a display unit for the purpose of displaying the diagnosis report.

The new safety controller and method are based on the idea of determining a diagnosis report which represents an ascertained operating state on the basis of the ascertained operating state and, additionally, on the basis of a selected special operating mode and/or a detected access authorization, wherein the ascertained operating state may be a process state for an installation to be controlled or a system state for the safety controller. This approach now provides the opportunity to make the conveyance of that information which represents an ascertained process state for the installation to be controlled or an ascertained system state for the safety controller more flexible and hence to be able to adjust the information to be displayed to match external circumstances.

A system state for a safety controller is any state which, on the one hand, the safety controller as such can adopt, i.e. the structural unit in which the logic components, such as processors or memories, required for implementing control tasks are accommodated, and, on the other hand, which those components of the installation which are electrically connected to said structural unit can adopt, such as sensors and actuators and also so-called signaling devices, such as mode selection switches which are likewise connected to said structural unit. This definition also includes all wiring. With a view to diagnosis, primarily those system states in which a fault occurs on one of the components listed above are of interest.

A process state for the installation to be controlled is any state which the installation to be controlled can adopt as a result of an application, wherein the application is defined by the user program running in the safety controller.

An operating mode in which an installation to be controlled can be operated is primarily understood to mean one of the modes described in the Standard DIN EN 12417. This may be an automatic mode, in which the installation to be controlled is operated with protective devices closed. Furthermore, it may be one of two special operating modes described in said Standard. On the one hand, it may be a set-up mode, in which a user can take intervening action in the process in order to prepare the installation for automatic mode when the guard door is open, the speed is significantly slowed down and further safety measures have been taken. Secondly, it may be an operating mode referred to as "extended manual intervening action", in which a user can operate a machine with the guard door open, for example. In this case, the user has a reduced selection of machine functions available which he can activate only if he keeps an consent switch (enable switch) pressed. Furthermore, a further mode comes into consideration, which is referred to as "process observation". In this case, a user can operate a machine with the guard door open without having to keep a consent switch pressed at the same time. This third special operating mode is not described in the above standard. In addition, further special operating modes are conceivable which are defined by the operator of an installation himself, for example. An example which may be cited at this occasion is a special operating mode referred to as "weekend mode". In this special operating mode, a large installation which has a plurality of units of identical design that permit parallel machining for the purpose of achieving a very high level of productivity is operated on a reduced scale at a weekend. That is to say that only a portion of these units is in operation at the weekend while another portion of these units is inoperative.

An access authorization is intended to be understood to mean a permission which is associated with a person and is therefore conceded to this person to take intervening action on an installation to be controlled, for example to operate an installation in one of the special operating modes described above. Just as there are different special operating modes, there are also different access authorizations. The user of a machine or installation usually has no kind of access authorization, i.e. he cannot make any interventions on the machine or installation. By contrast, a maintenance person has low level of access authorization, and he can take intervening action on the machine or installation to a particular extent. By way of example, a maintenance person is able to fill containers for cooling lubricants or hydraulic fluid. A set-up person, who can operate a machine or installation in set-up mode, has a medium level of access authorization. He is able to take any intervening action on a machine or installation which is necessary for preparing the automatic mode. The writer of a user program which runs in the safety controller and defines the automatic mode for a machine or installation has a high level of access authorization. He is able to take intervening action on a machine or installation which goes beyond that which a set-up person is able to take. As far as the writer of a user program is concerned, the following two situations may be distinguished: if the safety controller is the safety controller for a machine tool which is manufactured in significant quantities by a machine tool manufacturer, as is the case with lathes, milling machines or machining centers, for example, then the writer of the user program is usually an employee of the machine tool manufacturer. If, by contrast, the safety controller is the safety controller for a large machine installation which has been configured on a customer-specific basis and for which there is usually only the one copy which is with the user in existence, as is the case with installations in the chemical industry, for example, then the writer of the user program is usually an employee of the operator of the large machine installation. The manufacturer of the safety controller as such, i.e. the manufacturer of the structural unit which accommodates the logic components required for implementing control tasks, likewise has a high level of access authorization. In comparison with the writer of a user program, for whom the focus is actuation of a machine or installation, i.e. the implementation of combinations of movements, the focus for the manufacturer of the safety controller is on operation of the safety controller as such. For a safety officer wishing to check, by way of example, whether the protective apparatuses installed in an installation to be controlled need to be operated in accordance with legal requirements at prescribed intervals of time for test purposes, the focus for access authorization is on the reading of diagnosis memories rather than on allowing intervening action on the installation that is to be controlled.

Conveying the diagnosis report which represents the ascertained operating state on the basis of the detected access authorization is very effective in terms of the adjustment of the conveyance of information to match external circumstances. This measure allows the content of a diagnosis report to be displayed on a display unit, for example, to be adjusted to suit the person who is reading the diagnosis report on the display unit. In particular, the diagnosis report can be adjusted to the role which is associated with the person for the installation to be controlled or for the safety controller as such, said role being defined by means of the access authorization, for example.

The greatest effectiveness is obtained particularly with respect to an ascertained system state for the safety controller. As already mentioned above, an ascertained system state for the safety controller is usually an error state detected. Consequently, a diagnosis report is used to indicate the ascertained error.

Usually, a diagnosis report comprises four information components: a "what" component, which provides information about what has happened, i.e. what kind of a fault or what kind of an error is present. A "where" component, which provides information about where the fault or the error has occurred. A "how" component, which provides information about how the fault or the error can be rectified. A "who" component, which provides information about who can rectify the fault or the error.

Particularly in this case, it is very advantageous to adjust the diagnosis report that is to be displayed to suit the ability, specifically to suit the access authorization, which is associated with the person who is reading the display unit. In the case of a user, it is usually sufficient to notify him of what has occurred or is faulty and who can rectify the fault. Particularly information regarding who can rectify the fault, that is to say who is the appropriate contact person, results in a time saving and therefore in a cost saving, since the relevant person can be contacted directly. In the case of a user, it is not necessary to display how the fault can be rectified, since lack of access authorization means that he is unable to rectify the fault. In the case of a maintenance person, the diagnosis report—provided that a fault is involved which can be rectified on the basis of the maintenance person's access authorization—comprises not only the information regarding what has occurred but also a piece of information about where the fault has occurred and how it can be rectified. If it is a fault which he cannot rectify as a result of his access authorization, it suffices if the diagnosis report comprises a piece of information about what kind of a fault is present and who can rectify it. In the case of a set-up person, in the case of a writer of the user program and in the case of a manufacturer of the safety controller, a diagnosis report will usually comprise a piece of information about what has occurred, where it has occurred, how the fault can be rectified and who can do this. In this context, starting from the set-up person through to the writer of the user program and to the manufacturer of the safety controller, the information component regarding how a fault can be rectified will increase and at the same time the information component which can rectify a fault will decrease, since from the set-up person through to the writer of a user program and to the manufacturer of the safety controller, the opportunities for intervening action in the installation to be controlled or the safety controller increase on account of the increase in access authorization. In comparison with the set-up person and the writer of the user program, the manufacturer of the safety controller will have its focus on the safety controller in terms of the information component regarding what has occurred. In the case of a manufacturer of a safety controller concerning the displayed faults, logic hardware components which the safety controller comprises or the operating system implemented in the safety controller, for example. Diagnosis reports intended for a safety officer will comprise focal information regarding what kind of faults have occurred, and additionally information regarding when these faults have occurred.

With respect to an ascertained process state for the installation to be controlled, too, it is very effective to determine the diagnosis report representing the ascertained process state on the basis of the detected access authorization. The diagnosis report representing an ascertained process state comprises a piece of information about what state defined by the user program is being taken by the installation that is to be controlled. In this case too, the content of the information displayed by means of the display unit can be adjusted to suit the person who is reading the diagnosis report on the display unit. It is thus of great importance for a user, a maintenance person and a safety officer to be notified about individual process states which the installation to be controlled takes at a defined instant of time, whereas this is less important to a set-up person, a writer of a user program and the manufacturer of a safety controller. By way of example, for these people, diagnosis reports which represent a process state can be reduced to the information content "Correct operation" or "Faulty operation". Sometimes, the display of such diagnosis reports can even be dispensed with. Overall, this increases readability or clarity on a display unit.

With respect to an ascertained process state for the installation that is to be controlled, too, it is advantageous for the diagnosis report which represents this process state to be ascertained on the basis of the selected special operating mode. If the installation is being operated in automatic mode, all diagnosis reports which relate to ascertained process states should be displayed. In this case, however, it is recommended that the information content of the diagnosis report be adjusted to suit the role of the reader to whom the diagnosis report is being displayed by means of a display unit. By way of example, it is thus sufficient to notify the user of an installation that a particular liquid container needs to be filled. By contrast, a maintenance person can additionally be notified of where this container is located in the installation and, by way of example, where the liquid that is to be refilled is stored. For a safety officer, the information to be conveyed can be conditioned in terms of the evaluations which he needs to make, for example. The above explanations show that it is of particular advantage to determine diagnosis reports both on the basis of the selected special operating mode and on the basis of the detected access authorization. This is the case particularly because the access authorization which is associated with a person reading the display unit does not inevitably have to correlate to the selected special operating mode, as shown by the explanations above. If the installation is being operated in set-up mode, it is possible, by way of example, to stop diagnosis reports which represent process states which can be attributed to an open guard door, for example. This is because these diagnosis reports do not have any information content which goes beyond the knowledge of the set-up person who is taking measures on the installation to be controlled within the context of the set-up mode. The set-up person knows that the guard door is open. By contrast, diagnosis reports pitched specifically for the set-up mode can be displayed which, by way of example, comprise an information item regarding whether a combination of movements which is planned by the set-up person is consistent with the circumstances of the machine. If an installation is being operated in weekend mode, it is recommended to stop diagnosis reports which represent process states which stem from installation portions which have been shut down on account of the weekend mode, since these diagnosis reports can be disregarded in this special operating mode.

It is also particularly effective with respect to an ascertained system state for the safety controller to determine diagnosis reports which represent a system state on the basis of the selected special operating mode. If an installation is being operated in automatic mode, all diagnosis reports which represent system states should be displayed. It is also usually necessary in this case to indicate not only the information regarding what has occurred where but also who can rectify the fault. If, by contrast, the installation is being operated in an operating mode in which repair work on the installation can be performed, it is not necessary for diagnosis reports which represent a system state to comprise details about who can rectify a fault, since usually people who perform the repairs have the relevant ability. In such a case, it is instead advantageous to display information about what needs to be done to rectify the fault. Similarly, it may be advantageous to display datasheets or similar information about a component that needs to be repaired or replaced.

The above explanations show that the new approach is successful in displaying diagnosis reports and hence adjusting the information in a particularly effective manner to suit external circumstances. The approach furthermore prompts particularly clear presentation of information on a display unit. In addition, it contributes to time and hence cost savings.

As shown by the above explanations, particularly effective adjustment of the diagnosis reports to suit an external circumstance can be achieved by virtue of diagnosis reports being identified on the basis of a detected access authorization. This adjustment can be increased further by additionally considering the ascertained operating state when determining the diagnosis reports.

The aforementioned object is therefore achieved completely.

In a preferred refinement, the diagnosis selection unit stores a plurality of diagnosis reports which are different from one another, wherein each of said diagnosis reports represents said ascertained operating state, wherein the diagnosis selection unit selects one of said diagnosis reports on the basis of the selected special operating mode and/or the detected access authorization.

This measure ensures that all the necessary diagnosis reports are stored, and hence are available for optimum adjustment of the information that is to be presented by the diagnosis report to suit the selected special operating mode and/or to suit the detected access authorization, for an ascertained operating state, specifically regardless of whether it is a process state for the installation to be controlled or a system state for the safety controller. Hence, optimum adjustment of the information that is to be presented to suit an external circumstance is possible.

In a further refinement, a plurality of diagnosis reports which are different from one another are stored for each of the plurality of operating states.

This measure has the advantage that the optimum diagnosis report—in each case in view of the selected special operating mode and/or the detected access authorization—can be ascertained for each of the plurality of operating states. Particularly effective adjustment to suit external circumstances is therefore possible.

In a further refinement of the aforementioned measure, the detected access authorization is one of a plurality of defined access authorizations which are different from one another, wherein the plurality of diagnosis reports which are different from one another comprises a respective associated diagnosis report for each of the special operating states which are different from one another and/or for each of the access authorizations which are different from one another.

This measure ensures that the optimum diagnosis reports in each case are stored, and hence can be selected and hence identified on the basis of the selected special operating mode and/or the detected access authorization, not only for each of the possible special operating modes but also for each of the possible access authorizations.

In a further refinement, the detection unit and the display unit form a structural unit.

On the basis of this measure, a person reading the display unit can easily adjust the diagnosis report displayed by means of the display unit to suit the access authorization associated with him. The particular advantage is that this adjustment is possible directly during reading.

In a further refinement, the detection unit is designed to detect the access authorization by virtue of interaction with a mobile access authorization unit.

Advantageously, the access authorization unit in this case represents that access authorization which is associated with the person who is interacting with the safety controller. This measure allows particularly flexible handling when detecting an access authorization. Since the access authorization unit, which represents the access authorization, is of mobile design, the access authorization can be detected at different locations. If the installation to be controlled comprises a plurality of display units, each of these display units is able to detect the access authorization, provided that each of said display units has a detection unit. Furthermore, the mobile implementation of the access authorization unit has the advantage that individual people can be explicitly allocated an access authorization.

In a further refinement of the aforementioned measure, the access authorization unit has a mechanical key which can be put into a key holder arranged in the detection unit.

Advantageously, the key holder is designed to be put into a plurality of positions by rotating the mechanical key, each of said positions representing an access authorization which is comprised in the plurality of prescribed access authorizations that are different from one another, wherein the position taken by the key holder after the mechanical key is rotated is dependent on the shaping of the mechanical key. This measure has the following advantage: in the field of safety control, the use of mechanical keys and corresponding key holders has proved itself to date for defining a special operating mode in which an installation to be controlled will be operated. Accordingly, mode selection switches in which a mechanical key is used are used in correspondingly high quantities and are therefore inexpensive. As a result, this measure allows inexpensive detection of the access authorization.

In a further refinement of the two aforementioned measures, the access authorization unit has a transponder, wherein the transponder comprises access authorization data which represents the access authorization.

In this refinement, the detection unit is in the form of a sensor for reading the transponder and the access authorization data represent the access authorization which is associated with the person who is interacting with the safety controller. In comparison with a mechanical key, the use of a transponder has the advantage that many more access authorizations can be distinguished, since many more different codes can be generated electronically than is possible using a mechanical mode selection switch. Hence, the use of a transponder allows particularly effective adjustment of the information that is to be conveyed to suit an external circumstance to be achieved. When a transponder is used, two alternative implementations are conceivable: in a first implementation, the transponder is inserted into the mechanical key. In a second implementation, the access authorization is defined using not a mechanical key but rather just a transponder.

In a further refinement, the detection unit has a number of input elements which can be used to input the access authorization. The number of input elements may be in the form of an alphanumeric input panel. The person interacting with the safety controller then inputs a code which is known only to him using the alphanumeric input panel, and by evaluating this code it is possible to detect the access authorization associated with this person. Since alphanumeric input panels are not very expensive, this is an inexpensive variant for detecting the access authorization.

In a further refinement, the mode selection unit is designed to select the special operating mode by virtue of interaction with a mobile special operating mode unit.

Advantageously, the special operating mode unit in this case represents the special operating mode that is to be selected. This measure allows particularly flexible handling when selecting a special operating mode. By virtue of the special operating mode unit being of mobile design, the special operating mode can be selected at different locations.

It is of particular advantage that a detection unit is provided for detecting the access authorization and a separate mode selection unit is provided for selecting the special operating mode. Since these are two separate and hence isolated units, the access authorization can be detected independently of the selected special operating mode. It is thus simultaneously possible for a special operating mode to have been selected and for an access authorization to be detected which do not necessarily correlate to one another. Hence, the diagnosis report and the information to be conveyed can be adjusted particularly well to suit an external circumstance.

In a further refinement of the aforementioned measure, the special operating mode unit has a transponder which comprises special operating mode data which represent a defined special operating mode.

In this refinement, the mode selection unit is in the form of a sensor for reading the transponder, and the special operating mode data represent the special operating mode which is intended to be selected.

In a further refinement, the user program has at least one safety control module, in which safety-related control input signals are processed in a failsafe manner, and has at least one standard control module, in which predominantly process-related control input signals are processed.

In this refinement, the plurality of sensors advantageously comprise a first number of sensors which are designed to detect safety-related variables, wherein said safety-related variables are supplied to the safety control module by means of safety-related control input signals, and a second number of sensors which are designed to detect process-related variables, wherein said process-related variables are supplied to the standard control module by means of process-related control input signals. Furthermore, this refinement advantageously also includes that the plurality of control output signals comprise a first number of control output signals which are identified in the safety control module and which are intended for activating a first number of actuators designed to perform safety-related actions, and they also comprise a second number of control output signals which are identified in the standard control module and which are intended to actuate a second number of actuators which are designed to perform process-related actions. This design of the user program, according to which the user program comprises at least one safety control module and at least one standard control module, allows one and the same user program to be used to handle both control tasks which are associated with the safety control aspect and control tasks which are associated with the standard control aspect. It is therefore possible to use a safety controller designed in line with this aspect to implement both control tasks which are associated with the safety control aspect and control tasks which are associated with the standard control aspect. This has the advantage that comprehensive control of an installation, i.e. control which covers both the safety control aspect and the standard control aspect, requires only one controller rather than two controllers, one of which handles the control tasks which are associated with the safety control aspect and one of which handles the control tasks which are associated with the standard control aspect. This also reduces the complexity required for the wiring. Overall, this measure is cost-effective way of implementing comprehensive control for an installation. At this occasion, it should be pointed out that the wording that the standard control module is used to process predominantly process-related control input signals means that the standard control module can also be used to process safety-related control input signals.

In a further refinement, the system state represents a faulty actuator and/or sensor.

Particularly in the case of diagnosis reports which represent a faulty actuator and/or sensor, it is advantageous to adjust the information that is to be conveyed to suit the role of the person who is reading the information. It is thus sufficient for a user of an installation, for example, to be informed that there is a faulty actuator or a faulty sensor. By contrast, it is useful to display additional information to a maintenance person. By way of example, this may be a piece of information about which actuator or which sensor is impaired. Using such a piece of component-specific information, the maintenance person is able to quickly replace the impaired component. A faulty actuator or impaired sensor is meant to be an actuator or sensor which is faulty or which cannot be explicitly evaluated for another reason. At this occasion, it should be explained what is meant to be understood by a sensor: a sensor may exclusively be a detection unit which can be used to detect a physical variable. Alternatively, a sensor may be designed as a combination comprising such a detection unit and a signal processing unit, wherein the signal processing unit is designed to perform various signal conditioning measures, for example analog/digital conversion or signal amplification.

In a further refinement of the aforementioned measure, the diagnosis selection unit is designed to determine the diagnosis report additionally on the basis of a location statement, wherein the location statement represents the installation location of the actuator and/or of the sensor within the installation.

Particularly in the case of a location statement, it is of particular advantage to include or ignore said location statement in a diagnosis report on the basis of the role of the person reading a display unit. It is thus irrelevant to a user of an installation where a faulty sensor or a faulty actuator is located, since he cannot make a replacement on account of a lack of access authorization. Consequently, a location statement can be dispensed with in a diagnosis report in the case of a user. The omission of the location statement results in increased clarity for the information displayed by means of a display unit. By contrast, a location statement is a useful piece of information for a maintenance person, since it allows him to quickly replace a faulty sensor or a faulty actuator. Consequently, a location statement should be comprised in a diagnosis report for a maintenance person.

In a further refinement, the user program is written by providing a plurality of software components, wherein the plurality of the software components correspond to a plurality of the plurality of installation hardware components comprised in the automated installation that is to be controlled.

On account of this measure, it is possible to write a user program in a particularly simple and clear manner. This makes for a relatively high level of failsafety for the programming of a safety controller.

When adjusting the diagnosis report to suit the person who is reading a display unit, it should now be stipulated which of these many information components is meant to be comprised in the diagnosis report in the first place and how detailed the explanation of the individual information component is meant to be. Both can be stipulated by evaluating the access authorization which is associated with the person. For a user, it is sufficient if this information component comprises a piece of information about what kind of fault is present and who can rectify it. That is to say that a diagnosis report intended for a user comprises a "what" component and a "who" component. For a maintenance person, a writer of a user program and a manufacturer of the safety controller, not only the information regarding what has occurred where but additionally the information regarding how the fault or the error can be rectified are important. Consequently, a diagnosis report intended for this person comprises not only a "what" component and a "where" component but additionally also a "how" component. In this case, the level of detail in the "how" component is adjusted to suit the options defined by the access authorization for taking intervening action on the installation and/or on the safety controller. This adjustment also applies to the "what" component and the "where" component. Thus, by way of example, the manufacturer of the safety controller can be provided with a specific display indicating which logic component comprised in the control device as such is faulty or which module of the operating system stored in the safety controller comprises an error, whereas it is sufficient to display to the writer of a user program merely the fact that there is an error in the safety controller. Consideration of the detected access authorization allows particularly effective adjustment of a diagnosis report to suit the person reading a display unit in respect of an ascertained system state, whereas, in respect of an ascertained process state, consideration of a selected special operating mode allows particularly effective adjustment of a diagnosis report to suit the person reading a display unit.

It goes without saying that the features mentioned above and the features which are yet to be explained below can be used not only in the respectively indicated combination but also in other combinations or on their own without departing from the scope of the present invention.

BRIEF DESCRIPTION OF THE DRAWINGS

Exemplary embodiments are illustrated in the drawing and are explained in more detail in the description below, in which.

DESCRIPTION OF PREFERRED EMBODIMENTS

Figure 1:
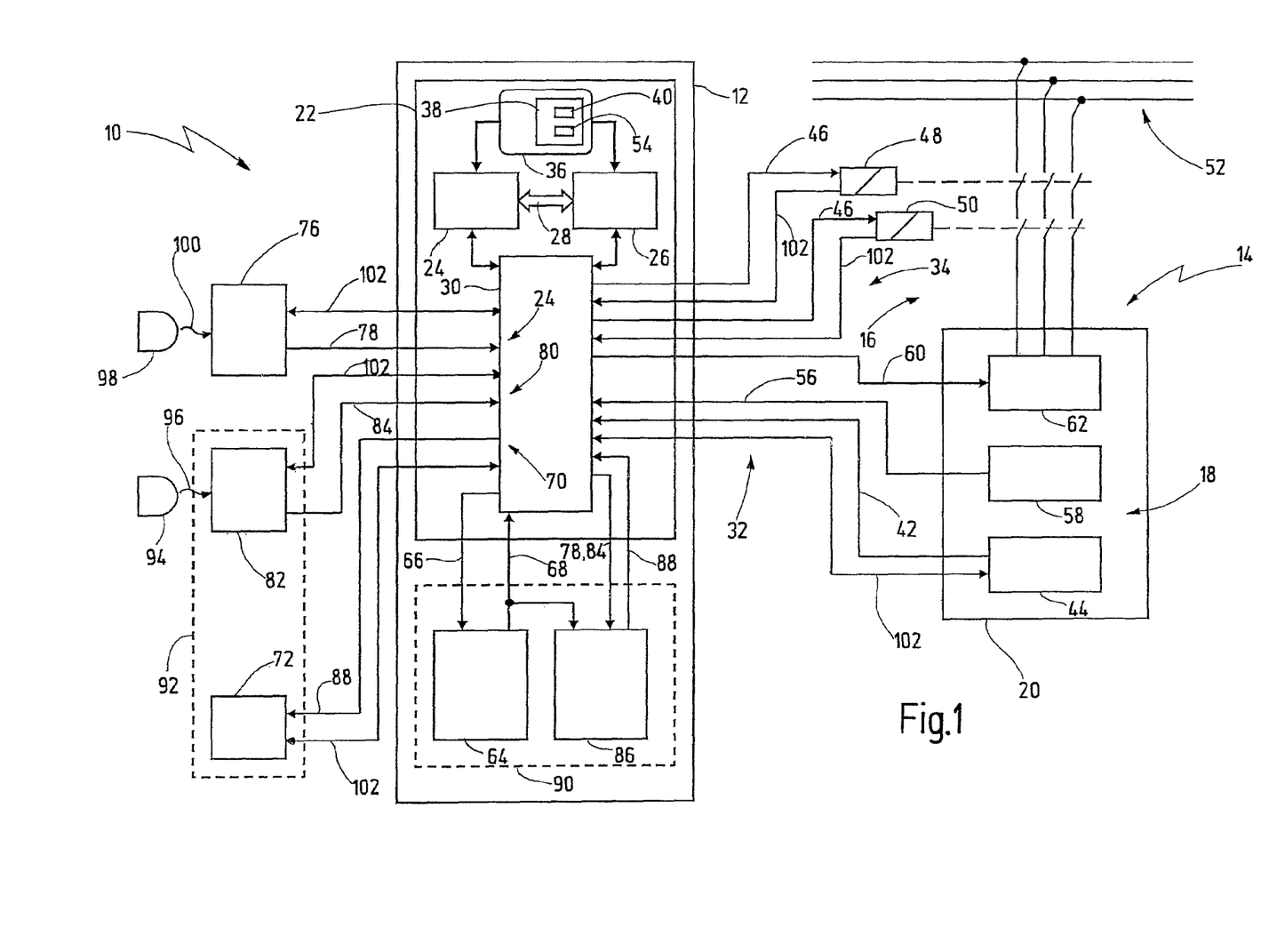
FIG. 1 shows a schematic illustration of a safety controller in combination with an installation to be controlled.

FIG. 1 shows a safety circuit, denoted as a whole by reference numeral 10, which has a safety controller 12 which is designed to control an installation which is denoted as a whole by the reference numeral 14. The installation 14 comprises a plurality 16 of actuators and a plurality 18 of sensors. As an example, a load 20 which the installation 14 comprises is shown, which may be a robot, for example.

The safety controller 12 comprises a control unit 22. The control unit 22 is of two-channel redundant design in order to achieve the required failsafety for controlling safety-critical processes. As a representation of the two-channel design, FIG. 1 shows two separate processors 24, 26 which are connected to one another by means of a bidirectional communication interface 28 in order to be able to monitor one another and to interchange data. Preferably, the two channels of the control unit 22 and the two processors 24, 26 are diverse, i.e. of different design to one another, in order to rule out systematic errors as far as possible.

Reference number 30 denotes an input/output unit which is connected to each of the two processors 24, 26. The input/output unit 30 receives a plurality 32 of control input signals from the plurality 18 of sensors and forwards said signals in an adjusted data format to each of the two processors 24, 26. In addition, the input/output unit takes the processors 24, 26 as a basis for producing a plurality 34 of control output signals which are used to actuate the plurality 16 of actuators.

Reference numeral 36 denotes a chip card which is used to store a user program 38. The user program 38 is written using a programming tool. By way of example, the programming tool is a computer program which can be executed on a conventional PC. In this case, the use of a chip card 36 as a storage medium allows simple interchange of the user program 38 even without direct connection to the PC on which the programming tool is executed. Alternatively, the user program 38 may also be stored in a memory, for example an EEPROM, which is permanently installed in the control unit 22.

User program 38 defines the control tasks to be performed by the safety controller 12. To this end, user program 38 comprises a safety control module 40 in which those control tasks which are associated with the safety control aspect are performed. In the safety control module 40, safety-related control input signals 42 produced by safety sensors 44 associated with the safety control aspect are processed in failsafe fashion. By way of example, the safety sensors 44 are emergency-off pushbuttons, two-hand controllers, guard doors, rotation speed monitoring appliances or other sensors for picking up safety-related parameters. In accordance with the associated control tasks in the safety control aspect, the safety-related control input signals 42 are taken as a basis for producing safety-related control output signals 46 which are used to actuate safety actuators 48, 50, actuators associated with the safety control aspect. By way of example, the safety actuators 48, 50 are what are known as contactors, the operating contacts of which are arranged in the connection between a power supply 52 and the load 20. The safety actuators 48, 50 can be used to disconnect the power supply for the load 20, which means that it is possible to transfer at least the load 20 to a safe state when a relevant malfunction occurs.

Furthermore, the user program 38 has a standard control module 54 which is used to perform those control tasks associated with the standard control aspect. To this end, the standard control module 54 is used to process process-related control input signals 56 which are produced by standard sensors 58. The standard sensors 58 are such sensors as to detect input variables which are required for drive regulation, for example. By way of example, these may be rotation speeds, such as angles or speeds. On the basis of the process-related control input signals 56, process-related control output signals 60 are produced in accordance with the control tasks associated with the standard control aspect and are supplied to standard actuators 62. By way of example, the standard actuators 62 may be motors or control cylinders.

The design chosen in the exemplary embodiment for the user program 38, according to which said user program comprises a safety control module 40 and a standard control module 54, which is why the control unit 22 performs both control tasks which are associated with the safety control aspect and control tasks which are associated with the standard control aspect, is not intended to have any limiting effect. It goes without saying that it is also conceivable for the control unit 22 to perform merely control tasks which are associated with the safety control aspect. In this case, the user program 38 does not comprise a standard control module 54.

The input/output unit 30 is also used for linking further components which the safety controller 12 comprises to the two processors 24, 26. Thus, a number 66 of diagnosis input signals are supplied to a diagnosis evaluation unit 64 from the input/output unit 30. The diagnosis evaluation unit 64 is designed to take the number 66 of diagnosis input signals as a basis for ascertaining which of a plurality of operating states is present at a defined instant of time. The plurality of operating states in this case include at least one process state for the installation 14 to be controlled and at least one system state for the safety controller 12. In this case, the system state is intended to detect not only the units and components which the safety controller 12 comprises but also all units which are electrically connected to the safety controller 12. These are the safety sensors 44, the safety actuators 48, 50, the standard sensors 58, the standard actuators 62 and also a display unit that is yet to be described and signaling devices that are yet to be described. Similarly, the system state is intended to cover all wiring which is present between the safety controller 12 and the units listed above.

The diagnosis evaluation unit 64 produces an operating state signal 68 which represents an ascertained operating state. The operating state signal 68 is supplied to the input/output unit 30. Hence, the control unit 22 can take suitable measures in accordance with the ascertained operating state. The safety controller 12 comprises an interface 70 for a display unit 72. The display unit 72 is designed to display diagnosis reports.

In addition, the safety controller 12 comprises an interface 74 for an operating mode selection unit 76. The mode selection unit 76 is designed to select one of a plurality of special operating modes that are different from one another, said special operating modes each being different from the automatic mode. The mode selection unit 76 provides a special operating mode signal 78 which represents the selected special operating mode. The special operating mode signal 78 is supplied to the control unit 22 in order to operate the installation 14 in the selected special operating mode.

In addition, the safety controller 12 has an interface 80 for a detection unit 82. The detection unit is designed to detect an access authorization which is associated with a person interacting with the safety controller 12, particularly with a person reading the display unit 72. The detection unit 82 provides an access authorization signal 84 which represents the detected access authorization.

Furthermore, the safety controller 12 has a diagnosis selection unit 86. The diagnosis selection unit 86 is supplied with the operating state signal 68. In addition, the diagnosis selection unit 86 is supplied with the special operating mode signal 78 and/or with the access authorization signal 84 via the input/output unit 30. On the basis of the ascertained operating state and on the basis of the selected special operating mode and/or the detected access authorization, the diagnosis selection unit 86 identifies a diagnosis report which represents the ascertained operating state. The diagnosis selection unit 86 produces a diagnosis signal 88 which represents the diagnosis report and which is supplied to the display unit 72 via the input/output unit 30 for the purpose of displaying the diagnosis report. The diagnosis evaluation unit 64 and the diagnosis selection unit 86 may be combined to form a diagnosis unit 90, as indicated by the dashed illustration.

The display unit 72 and the detection unit 82 may be combined to form a structural unit 92, as indicated by the dashed illustration. Advantageously, the detection unit 82 can be integrated into the display unit 72.

The detection unit 82 is designed to detect the access authorization by interacting with a mobile access authorization unit 94, as indicated by an arrow 96. Various embodiments are conceivable for the detection unit 82 and hence also for the mobile access authorization unit 94. In a first embodiment, the mobile access authorization unit 94 is in the form of a mechanical key which can be put into a key holder which is arranged in the detection unit 82. This first embodiment corresponds to an operating mode selection switch in mechanical form. In a second embodiment, the mobile access authorization unit 94 may be in the form of a transponder, the data from which can be read by the detection unit 82 which is in the form of a reader. The transponder comprises access authorization data which represents the access authorization. A third embodiment is conceivable which is a combination of the first embodiment and the second embodiment. That is to say that the mechanical key comprises a transponder and the detection unit 82 comprises a reader for the transponder in the region of the key holder. In addition, a fourth embodiment is conceivable in which the detection unit 82 has a number of input elements which can be used to input the access authorization. In this case, the detection unit 82 is in the form of an alphanumeric input unit, for example. In this embodiment, a mobile access authorization unit 94 is not required. The order in which the individual embodiments are listed is not intended to be an assessment regarding opportunities for using them.

The mode selection unit 76 is designed to select the special operating mode by interacting with a mobile special operating mode unit 98, as illustrated by an arrow 100. The mobile special operating mode unit 98 may be in the form of a transponder which comprises special operating mode data representing a defined special operating mode. In this case, the mode selection unit 76 is in the form of a reader which can be used to read the special operating mode data from the transponder.

The mode selection unit 76 and the detection unit 82 are usually referred to as signaling devices.

The input/output unit 30 is used to interchange test signals 102 between the safety controller 12 and the safety sensors 44, the safety actuators 48, 50, the display unit 72, the mode selection unit 76 and the detection unit 82. The test signals 102 can be used in the safety controller 12 to ascertain whether the units and components connected to the latter are operating correctly, which is necessary, since it must be ensured that the installation 14 to be controlled is in a safe state as soon as a malfunction occurs on an appliance connected to the safety controller 12.

Figure 2:
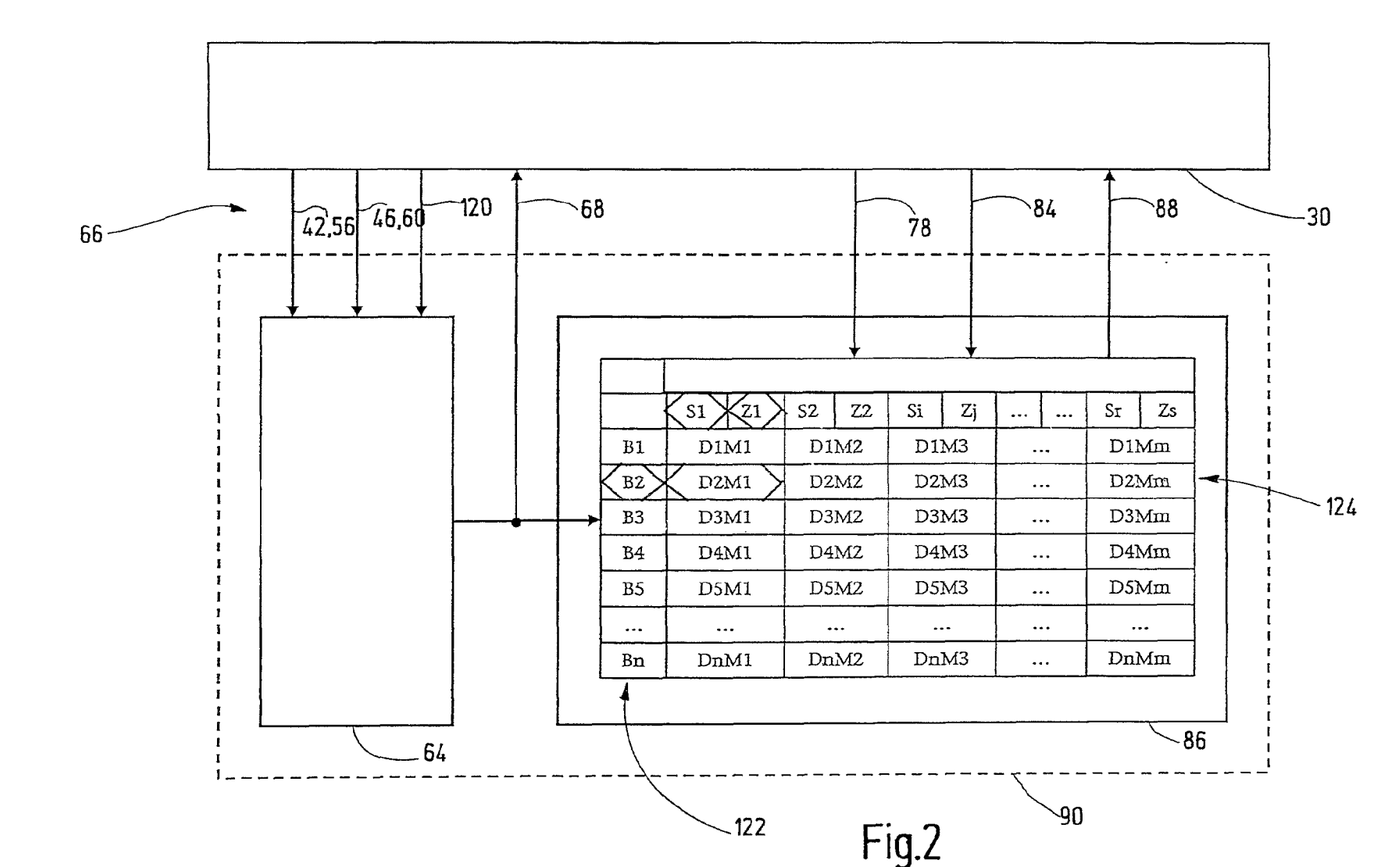
FIG. 2 shows a schematic illustration of a diagnosis selection unit which the safety controller comprises.

The illustration in FIG. 2 is used to explain the mode of operation of the diagnosis evaluation unit 64 and particularly the mode of operation of the diagnosis selection unit 86.

From the input/output unit 30, a number 66 of diagnosis input signals are supplied to the diagnosis evaluation unit 64. These may be the following signals: the safety-related control input signals 42 and the process-related control input signals 56; the safety-related control output signals 46 and the process-related control output signals 60 and also further signals 120. The further signals 120 may comprise the test signals 102, the access authorization signal 84, the special operating mode signal 78 and also signals identified and processed in the control unit 22.

On the basis of the signals supplied in total, the diagnosis evaluation unit 64 ascertains which of a plurality of operating states 122 is present at a defined instant of time. This is done by virtue of appropriate evaluation of the supplied signals. The ascertained operating state may be a process state for the installation 14 to be controlled or may be a system state for the safety controller 22. By way of example, a system state may be a short circuit to ground or to the supply voltage, may be a sensor fault, may be an actuator fault, may be a conductor fracture, may be an error occurring in the chip card 36, may be an error occurring in one of the processors 24, 26 or may be a similar error. Usually, a process state for the installation to be controlled is ascertained by comparing particularly the process-related control input signals 56 with prescribed threshold values.

The diagnosis evaluation unit 64 produces an operating state signal 68 which represents the ascertained operating state. The operating state signal 68 is supplied both to the input/output unit 30 and to the diagnosis selection unit 86. As shown by the illustration in FIG. 2, the ascertained operating state is intended to be the operating state B2, as indicated by the chamfered corners. The diagnosis selection unit 86 stores a plurality of diagnosis reports that are different from one another for each of the plurality of operating states 122. For the ascertained operating state B2, a plurality 124 of diagnosis reports that are different from one another are stored. From the input/output unit 30, the special operating mode signal 78, which represents the selected special operating mode, and the access authorization signal 84, which represents the detected access authorization, are supplied to the diagnosis selection unit 86. In the present case, the selected special operating mode is meant to be the special operating mode S1 and the detected access authorization is meant to be the access authorization Z1, as respectively indicated by the chamfered corners. Accordingly, the diagnosis selection unit 86 selects the diagnosis report D2M1 from the plurality 124 of diagnosis reports that are different from one another and produces the diagnosis signal 88, which represents this diagnosis report and is supplied to the input/output unit 30 for the purpose of forwarding to the display unit 72.

The diagnosis selection unit 86 stores a plurality of diagnosis reports that are different from one another for each of the plurality of operating states 122. Each of the plurality of diagnosis reports that are different from one another comprises a respective associated diagnosis report for each of the special operating mode states S1 to Sr that are different from one another and/or for each of the access authorizations Z1 to Zs that are different from one another. Overall, the diagnosis selection unit 86 stores the diagnosis reports D1M1 to DnMn for the plurality of operating states 121 B1 to Bn.

The embodiment on which the exemplary embodiment is based for the safety controller, according to which the safety controller is used to handle both control tasks which are associated with the safety control aspect and control tasks which are associated with the standard control aspect using one and the same control unit, is not mandatory for implementing the concept of the invention. For both categories of control tasks, it is also possible to use separate control units.

The display unit 72 may be arranged in a control console which the installation 14 comprises. Alternatively, it may be a separate display unit. It may be in the form of an LCD screen or in the form of an alphanumeric text channel.

The process diagnosis report may be "Container empty", for example. Examples of suitable system diagnosis reports are "Memory faulty", "Short circuit to 24 V" or "Hardware error".

What is claimed is:

1. A safety controller for controlling an automated installation which comprises a plurality of sensors including at least one guard door sensor for signaling when a guard door is closed and a plurality of actuators, the safety controller comprising:

a control unit to which a plurality of control input signals are supplied by the sensors, wherein the control unit is designed to produce a plurality of control output signals on the basis of the control input signals in accordance with a user program running in said control unit either in an automatic mode or in one from a plurality of special operating modes, wherein the guard door is closed in the automatic mode and wherein the guard door is open in any of the special operating modes, and wherein the plurality of control output signals are used to actuate the plurality of actuators, a diagnosis evaluation unit to which a number of diagnosis input signals are supplied, wherein the diagnosis evaluation unit is designed to take the number of diagnosis input signals as a basis for ascertaining which of a plurality of operating states is present at a defined instant of time, wherein the plurality of operating states comprise at least one process state for the installation to be controlled and at least one system state for the safety controller, wherein the diagnosis evaluation unit produces at least one operating state signal which represents an ascertained operating state, a display unit designed to display diagnosis reports, an operating mode selection unit which is designed to select one from the plurality of special operating modes which are different from one another, wherein the mode selection unit provides a special operating mode signal which represents a selected special operating mode, wherein said special operating mode signal is supplied to the control unit in order to operate the installation in the selected special operating mode, when the guard door is open, a detection unit, wherein the detection unit is designed to detect an access authorization associated with a person interacting with the safety controller, wherein the detection unit provides an access authorization signal which represents the detected access authorization, and a diagnosis selection unit to which the operating state signal, the special operating mode signal and the access authorization signal are supplied, wherein the diagnosis selection unit stores a plurality of predefined diagnosis reports for each of the plurality of operating states, which diagnosis reports are different from one another, wherein the plurality of diagnosis reports comprises a respective diagnosis report associated with each combination of the ascertained operating state, the selected special operating mode, and the detected access authorization, wherein the diagnosis selection unit selects a diagnosis report from the plurality of predefined diagnosis reports as a function of the ascertained operating state and as a function of the selected special operating mode and the detected access authorization, and wherein the diagnosis selection unit produces a diagnosis signal which represents the diagnosis report and which is supplied to the interface for the display unit for the purpose of displaying the diagnosis report.

2. The safety controller of claim 1, wherein the detected access authorization is one of a plurality of predefined access authorizations which are different from one another, and wherein the plurality of diagnosis reports comprises a respective diagnosis report associated with each combination of the ascertained operating state and the detected access authorization.

3. The safety controller of claim 1, wherein the detection unit and the display unit form one structural unit.

4. The safety controller of claim 1, wherein the detection unit is designed to detect the access authorization by virtue of interaction with a mobile access authorization unit.

5. The safety controller of claim 4, wherein the detection unit comprises a key holder for receiving a mobile access authorization key.

6. The safety controller of claim 4, wherein the detection unit comprises a transponder reader and said access authorization unit comprises a transponder having access authorization data representing the access authorization.

7. The safety controller of claim 1, wherein the detection unit has a number of input elements which allow to input the access authorization manually.

8. The safety controller of claim 1, wherein the mode selection unit is designed to select the special operating mode by virtue of interaction with a mobile special operating mode unit.

9. The safety controller of claim 8, wherein the special operating mode unit comprises a transponder having special operating mode data which represent a defined special operating mode.

10. The safety controller of claim 1, wherein the user program has at least one safety control module, in which safety-related control input signals are processed in a failsafe manner, and has at least one standard control module, in which process-related control input signals are processed.

11. The safety controller of claim 1, wherein the system state represents a faulty actuator or faulty sensor.

12. The safety controller of claim 11, wherein the diagnosis selection unit is designed to determine the diagnosis report also as a function of a location statement, wherein the location statement represents a spatial location of the faulty actuator or the faulty sensor within the installation.

13. A method for controlling an automated installation which comprises a plurality of sensors including at least one guard door sensor for signaling when a guard door is closed and a plurality of actuators, the method comprising the following steps:

supplying a plurality of control input signals to a control unit by the sensors, wherein the control unit produces a plurality of control output signals on the basis of the control input signals and in accordance with a user program running in said control unit either in an automatic mode or in one from a plurality of special operating modes, wherein the guard door is closed in the automatic mode and wherein the guard door is open in any of the special operating modes, wherein the plurality of control output signals actuate the plurality of actuators, ascertaining which of a plurality of operating states is present at a defined instant of time on the basis of a number of diagnosis input signals, wherein the plurality of operating states comprise at least one process state for the installation to be controlled and at least one system state for the safety controller, and producing an operating state signal which represents an ascertained operating state, selecting one of a plurality of special operating modes which are different from one another, wherein the special operating modes each are different from the automatic mode, and providing a special operating mode signal which represents the selected special operating mode, detecting an access authorization associated with a person interacting with the safety controller, and providing an access authorization signal which represents the detected access authorization, supplying the operating state signal, the special operating mode signal and the access authorization signal to a diagnosis selection unit, wherein the diagnosis selection unit stores a plurality of different predefined diagnosis reports for each of the plurality of operating states, selecting a diagnosis report from the plurality of predefined diagnosis reports, with the selected diagnosis report representing the ascertained operating state as a function of the ascertained operating state and as a function of the selected special operating mode and the detected access authorization, wherein the plurality of diagnosis reports comprises a respective diagnosis report associated with each combination of the ascertained operating state and the selected special operating mode, producing a diagnosis signal representing the diagnosis report in the diagnosis selection unit, and supplying the diagnosis signal to a display unit for the purpose of displaying the selected diagnosis report.

14. A non-transitory computer readable storage medium containing a computer program comprising program code designed to run on a control unit of a safety controller for controlling an automated installation which comprises a plurality of sensors including at least one guard door sensor for signaling when a guard door is closed and a plurality of actuators, wherein said program code is further designed to carry out a method comprising the following steps, when the program code is executed on the control unit:

receiving a plurality of control input signals from the sensors at the control unit and producing a plurality of control output signals on the basis of the control input signals either in an automatic mode or in one from a plurality of special operating modes, wherein the guard door is closed in the automatic mode and wherein the guard door is open in any of the special operating modes, wherein the plurality of control output signals actuate the plurality of actuators, ascertaining which of a plurality of operating states is present at a defined instant of time, wherein the plurality of operating states comprise at least one process state for the installation to be controlled and at least one system state for the safety controller, and producing an operating state signal which represents an ascertained operating state, selecting one from the plurality of special operating modes which are different from one another, wherein the special operating modes each are different from the automatic mode, wherein the guard door is open in any of the special operating modes, and providing a special operating mode signal which represents the selected special operating mode, detecting an access authorization associated with a person interacting with the safety controller, and providing an access authorization signal which represents the detected access authorization, supplying the operating state signal, the special operating mode signal and the access authorization signal to a diagnosis selection unit, wherein the diagnosis selection unit stores a plurality of different predefined diagnosis reports for each of the plurality of operating states, selecting a diagnosis report from the plurality of predefined diagnosis reports, with the selected diagnosis report representing the ascertained operating state as a function of the ascertained operating state and as a function of the selected special operating mode and the detected access authorization, wherein the plurality of diagnosis reports comprises a respective diagnosis report associated with each combination of the ascertained operating state and the selected special operating mode, producing a diagnosis signal representing the diagnosis report in the diagnosis selection unit, and supplying the diagnosis signal to a display unit for the purpose of displaying the selected diagnosis report.

\* \* \* \* \*